United States Patent [19]

Kosuga et al.

[11] Patent Number: 5,776,616
[45] Date of Patent: Jul. 7, 1998

[54] LAMINATED POLYESTER FILM TO BE LAMINATED ON METAL PLATE

[75] Inventors: Masahiko Kosuga; Hideshi Kurihara, both of Matsuyama, Japan

[73] Assignee: Teijin Limited, Osaka, Japan

[21] Appl. No.: 544,100

[22] Filed: Oct. 17, 1995

[30] Foreign Application Priority Data

Oct. 18, 1994 [JP] Japan ............................. 6-251826

[51] Int. Cl.⁶ .......................... B32B 27/06; B32B 27/36; B32B 15/08
[52] U.S. Cl. .......................... 428/480; 428/483; 428/458; 428/332
[58] Field of Search ............................. 428/458, 480, 428/483, 332, 213, 220, 457

[56] References Cited

U.S. PATENT DOCUMENTS

| | | | |
|---|---|---|---|
| 4,362,775 | 12/1982 | Yabe et al. | 428/213 |
| 5,424,121 | 6/1995 | Murakami et al. | 428/337 |

FOREIGN PATENT DOCUMENTS

| | | |
|---|---|---|
| 0580404 | 7/1993 | European Pat. Off. |
| 0580404 | 1/1994 | European Pat. Off. |
| 646455A1 | 4/1995 | European Pat. Off. |
| 68533241 | 12/1995 | European Pat. Off. |
| 0694580 | 1/1996 | European Pat. Off. |
| 64-22530 | 1/1989 | Japan |
| 1192545 | 2/1989 | Japan |
| 1192546 | 2/1989 | Japan |
| 2057339 | 2/1990 | Japan |
| 5320377 | 12/1993 | Japan |
| 6116376 | 4/1994 | Japan |
| 2279905 | 1/1995 | United Kingdom |
| 9508442 | 3/1959 | WIPO |

*Primary Examiner*—John J. Zimmerman
*Assistant Examiner*—Michael LaVilla
*Attorney, Agent, or Firm*—Sherman & Shalloway

[57] ABSTRACT

A laminated polyester film which comprises a first layer formed of a first aromatic copolyester, and a second layer of a molten blend having an alkali metal element concentration of 1 to 40 ppm, which comprises a second aromatic polyester containing ethylene terephthalate as a main recurring unit and a third aromatic polyester containing tetramethylene terephthalate as a main recurring unit.

The laminated polyester film exhibits excellent moldability when a metal plate laminated therewith is deep drawn, and is excellent in impact resistance and flavor retaining property after can making.

25 Claims, No Drawings

LAMINATED POLYESTER FILM TO BE LAMINATED ON METAL PLATE

FIELD OF THE INVENTION

This invention relates to a laminated polyester film to be laminated on a metal plate. More specifically, it relates to a laminated polyester film to be laminated on a metal plate, which exhibits excellent moldability in can-making processing such as drawing of a metal plate laminated with the film, and which enables the production of metal cans such as beverage cans and food cans which are excellent in heat resistance, resistance to retort treatment, flavor retaining property, impact resistance, rustproof property and the like.

BACKGROUND OF THE INVENTION

Inner and outer surfaces of metal cans generally have coatings for protection against corrosion. For simplifying the manufacturing step, improving sanitary conditions and preventing environmental pollution, there have been recently developed methods of imparting rustproof properties to metal cans without using any organic solvent. One of the methods is to coat metal cans with a film of a thermoplastic resin. That is, studies have been being made of a method in which a plate of tin-plated steel, tin-free steel or aluminum is laminated with a film of a thermoplastic resin and the resultant laminate is drawn to make cans. Attempts have been made to use a polyolefin film or a polyamide film as the above film of a thermoplastic resin, but not all of moldability, heat resistance, flavor retaining property and impact resistance are satisfied.

On the other hand, a polyester film, or a polyethylene terephthalate film in particular, is drawing attention as one having well-balanced properties, and several proposals have been made to use it as a base film as follows.

(A) A metal plate is laminated with a biaxially oriented polyethylene terephthalate film through an adhesive layer of a polyester having a low melting point, and the resultant laminate is used as a material for making cans (see Japanese Laid-open Patent Publication Nos. Sho 56-10,451 and Hei 1-192,546).

(B) A metal plate is laminated with a film of an aromatic polyester having amorphous nature or very low crystallinity, and the resultant laminate is used as a material for making cans (see Japanese Laid-open Patent Publication Nos. Hei 1-192,545 and Hei 2-57,339).

(C) A metal plate is laminated with a heat-set, biaxially oriented polyethylene terephthalate film having a low orientation degree, and the resultant laminate is used as a material for making cans (see Japanese Laid-open Patent Publication No. Sho 64-22,530).

As for (A), the biaxially oriented polyethylene terephthalate film is excellent in heat resistance and flavor retaining property, while it is poor in moldability so that it is whitened (causes fine cracks) or broken during can-making processing which entails large deformation.

As for (B), the film used is an amorphous or very low crystalline aromatic polyester film and therefore has excellent moldability, while the film is poor in flavor retaining property and is liable to embrittle when printing is effected on the film, cans are post-treated for retort treatment, or cans are stored for a long period of time, and the embrittled film is liable to break due to an external impact.

As for (C), the laminate is to produce an effect in a region between (A) and (B), while the film has not yet attained a low orientation degree which can be applied to can-making processing. Further, even if the laminate is moldable in a region where the degree of deformation is small, the film is liable to embrittle when printing is thereafter effected or when the can is subjected to retort treatment for sterilizing canned contents, and the embrittled film is liable to break due to an external impact, as discussed for (B).

Further, Japanese Laid-open Patent Publication No. Hei 5-339,348 proposes a polyester film to be laminated with a metal plate and processed thereafter, which is formed from a copolyester having a specific melting point, a specific glass transition temperature and a specific concentration of a terminal carboxyl group. Japanese Laid-open Patent Publication No.Hei 6-39,979/1994 proposes a polyester film to be laminated on a metal plate and processed thereafter, which is a laminate of a copolyester having a specific melting point and a specific glass transition temperature. However, studies conducted by the inventors of the present invention revealed that these films are poor in resistance to hydrolysis at high-temperatures and that, when cans using these films are used, for example, as beverage containers, and in particular, when cans are filled with contents such as mineral water, the influence of the polyester film on taste and flavor differs according to kind of beverage.

JP-A-6-116376 proposes a copolyester film for molding to be laminated on a metal plate, which contains a copolyester containing specific amounts of an alkali metal element and germanium element and has improved flavor retaining property. However, when such film is used for can making, the impact resistance of the polyester film is insufficient and both requirements for flavor retaining property and impact resistance cannot be satisfied.

OBJECTS OF THE INVENTION

It is therefore an object of the present invention to provide a novel laminated polyester film to be laminated on a metal plate.

It is another object of the present invention to provide a laminated polyester film to be laminated on a metal plate, which has excellent resistance to hydrolysis at high-temperatures and improved impact resistance and flavor retaining property after can making while retaining excellent moldability, heat resistance and retort resistant of a polyester film.

Other objects and advantages of the present invention will be apparent from the following description.

SUMMARY OF THE INVENTION

According to the present invention, the above objects and advantages are attained by a laminated polyester film to be laminated on a metal plate, which comprises:

(A) a first layer formed of a first aromatic copolyester (a1) which contains terephthalic acid as a main dicarboxylic acid component and ethylene glycol as a main glycol component and which has (a2) a melting point in the range of 210° to 245° C. and (a3) a glass transition temperature of at least 60° C., and (B) a second layer formed of a molten blend which comprises 60 to 99% by weight of a second aromatic polyester (b1) which contains ethylene terephthalate as a main recurring unit and which has (b2) a melting point in the range of 210° to 255° C. and (b3) a glass transition temperature of at least 60° C. and 1 to 40% by weight of a third aromatic polyester (c1) which contains tetramethylene terephthalate as a main recurring unit and which has (c2) a melting point of 180° to 223° C., and which contains 1 to 40 ppm of an alkali metal, in ionic form, and (C) which exhibits excellent moldability when a metal plate laminated therewith is deep-drawn.

DETAILED DESCRIPTION OF THE INVENTION

As described above, the laminated polyester film of the present invention comprises the first layer (A) and the second layer (B).

The first layer is formed of the first aromatic copolyester which contains terephthalic acid as a main dicarboxylic acid component and ethylene glycol as a main glycol component.

Illustrative examples of a dicarboxylic acid other than the terephthalic acid constituting the first aromatic copolyester include aromatic dicarboxylic acids such as isophthalic acid, phthalic acid and naphthalene dicarboxylic acid; aliphatic dicarboxylic acids such as adipic acid, azelaic acid, sebacic acid and dodecanedicarboxylic acid; alicyclic dicarboxylic acids such as cyclohexanedicarboxylic acid; and the like.

Similarly, illustrative examples of a diol other than ethylene glycol constituting the first aromatic copolyester include aliphatic diols represented by HO—$(CH_2)n$—OH (n=3 to 10) such as butane diol and hexane diol; branched glycols represented by HO—$CH_2$—$C(R)_2$—$CH_2$—OH (R=alkyl group having 1 to 4 carbon atoms) such as neopentyl glycol; diethylene glycols (DEG); triethylene glycols (TEG); alicyclic diols such as cyclohexane dimethanol; polyoxyalkylene glycols such as polyethylene glycol and polypropylene glycol; and the like. They may be used alone or in combination of two or more.

The first aromatic copolyester preferably contains an ethylene isophthalate unit in addition to an ethylene terephthalate unit.

The first aromatic copolyester has a melting point in the range of 210° to 245° C. When the melting point is below 210° C., heat resistance deteriorates. When the melting point is above 245° C., moldability is greatly impaired. The melting point of the first aromatic copolyester is preferably in the range of 215° to 235° C.

The first aromatic copolyester has a glass transition temperature of at least 60° C. When the glass transition temperature is below 60° C., satisfactory flavor retaining property cannot be ensured. Since such a copolyester is a copolyester having a high glass transition temperature, an isophthalic acid-copolymerized polyethylene terephthalate is particularly preferred.

The glass transition temperature of the first aromatic copolyester is preferably at least 70° C.

Since the melting point and glass transition temperature of the first aromatic copolyester depend on kinds and amounts of copolymer components, kinds and amounts of the copolymer components are experimentally selected to satisfy the above values.

The measurements of the melting point and glass transition temperature of the copolyester are carried out by a method for obtaining a melting peak and a glass transition temperature peak at a temperature elevation rate of 20° C./minute, using a Du Pont Instruments 910 DSC. The amount of a sample is approximately 20 mg.

The first aromatic polyester has an intrinsic viscosity preferably in the range of 0.52 to 1.50 dl/g, more preferably 0.57 to 1.00 dl/g, particularly preferably 0.60 to 0.80 dl/g. When the intrinsic viscosity is below 0.52 dl/g, the strength and elongation of the copolyester film is insufficient, undesirably resulting in unsatisfactory moldability and impact resistance. On the other hand, when the intrinsic viscosity is above 1.50 dl/g, the melt viscosity of the copolyester is too high and the amount of heat generated by shearing within an extruder during film formation is too large, resulting in the by-production of a large amount of free terephthalic acid, which may deteriorate flavor retaining property disadvantageously.

The intrinsic viscosity is measured for each sample as dissolved in ortho-chlorophenol at 35° C.

The first aromatic copolyester can contain an alkali metal element. By containing an alkali metal element, the by-production of free terephthalic acid can be suppressed and adhesion to a cooling roll is improved at the time when the molten substance is discharged from a polymerizer and wound around the cooling roll. When the first aromatic copolyester contains an alkali metal element, the alkali metal element is preferably contained in an amount of 1 to 40 ppm.

Any production method for the first aromatic copolyester is acceptable. For example, there can be preferably employed a method for producing the first aromatic copolyester in which terephthalic acid, ethylene glycol and a copolymerizable component are subjected to an esterification reaction and the resulting reaction product is subjected to a polycondensation reaction until it attains a desired polymerization degree, and a method for producing the first aromatic copolyester in which terephthalic acid dimethyl ester, ethylene glycol and a copolymerizable component are subjected to an ester exchange reaction and the resulting reaction product is subjected to a polycondensation reaction until it attains a desired polymerization degree.

The first aromatic copolyester produced by any one of the methods above can be, as required, converted into a first aromatic copolyester having a higher polymerization degree by subjecting to a polycondensation process (solid-phase polymerization) while it is in a solid-phase state.

The catalyst used in the above polycondensation reaction is not particularly limited, but is selected preferably from an antimony compound, titanium compound, germanium compound and the like. Among these, particularly preferred is a germanium compound from a view point of flavor retaining property.

Preferred examples of the antimony compound include antimony trioxide, antimony acetate and the like. Preferred examples of the titanium compound include titanium tetrabuthoxide, titanium acetate and the like. Preferred examples of the germanium compound include (a) amorphous germanium oxide, (b) fine crystalline germanium oxide, (c) a solution prepared by dissolving germanium oxide in glycol in the presence of an alkaline metal, alkaline earth metal or a compound of any one of these compounds, (d) a solution of germanium oxide in water, (e) germanium tetrachloride, and (f) a solution of tetraethoxy germanium in glycol.

To include the alkali metal element described above in the first aromatic copolyester, an alkali metal compound may be added in any stage of the above polycondensation reaction or in any stage of melt extrusion for molding a film. The alkali metal compound to be added may be powdery, or dissolved or dispersed in a glycol component used in the production of a copolyester.

Illustrative examples of the alkali metal compound include sodium hydroxide, potassium hydroxide, lithium hydroxide, sodium acetate, potassium acetate, lithium acetate, sodium benzoate, potassium benzoate, lithium benzoate, sodium carbonate, potassium carbonate, lithium carbonate and the like.

The first aromatic copolyester may contain inert fine particles as required. Preferably, the inert fine particles have an average particle diameter of 0.05 to 0.6 μm and are contained in an amount of 0.01 to 1% by weight based on the first aromatic copolyester. The inert fine particle is preferably spherical with preferred examples thereof including spherical silica, spherical titanium oxide, spherical zirconium and spherical silicone resin particle.

The inert fine particles are preferably added in any stage of the polycondensation reaction of the copolyester.

The second layer (B) constituting the laminated polyester film of the present invention is formed of a molten blend of the second aromatic polyester and the third aromatic polyester.

The second aromatic polyester contains ethylene terephthalate as a main recurring unit.

Examples of the aromatic dicarboxylic acids other than terephthalic acid and the diol other than ethylene glycol constituting the second aromatic polyester are the same as those provided for the first aromatic copolyester.

The second aromatic polyester may contain at least one dicarboxylic acid component selected from the group consisting of an aromatic dicarboxylic acid other than terephthalic acid, an aliphatic dicarboxylic acid and an alicyclic dicarboxylic acid in an amount of 2 to 19 mol % based on the total of all dicarboxylic acid components and may also contain at least one glycol selected from the group consisting of an aliphatic glycol other than ethylene glycol and an alicyclic glycol in an amount of 2 to 19 mol % based on the total of all glycol components.

The second aromatic polyester has a melting point in the range of 210° to 255° C. When the melting point is below 210° C., heat resistance deteriorates, and when the melting point is above 225° C., moldability is greatly impaired due to too high crystallinity of the polymer.

The melting point of the second aromatic polyester is preferably in the range of 220° to 245° C.

The preferable range of the intrinsic viscosity of the second aromatic polyester is the same as that of the first aromatic polyester.

The second aromatic polyester preferably has a glass transition temperature of at least 60° C., more preferably at least 70° C.

The second aromatic polyester preferably contains 1 to 40 ppm of an alkali metal element. As a method for including the alkali metal element in the second aromatic polyester, the method for including the alkali metal element in the first aromatic copolyester described above can be used. The alkali metal compounds described above can be used as alkali metal element sources.

Although the second aromatic polyester produced by any method can be used, preferred are those obtained using a germanium compound as a polycondensation catalyst.

The third aromatic polyester which is the other component constituting the second layer (B), contains tetramethylene terephthalate as a main recurring unit.

Examples of the aromatic dicarboxylic acid other than terephthalic acid constituting the third aromatic polyester are the same as those provided for the first aromatic copolyester. Examples of the diol other than tetramethylene glycol include aliphatic diols represented by HO—$(CH_2)_m$—OH (m=2, 3, 5 to 10) such as ethylene glycol and hexane diol, branched glycols represented by HO—$CH_2$—$C(R)_2$—$CH_2$—OH (R=alkyl group having 1 to 4 carbon atoms) such as neopentyl glycol, diethylene glycols (DEG), triethylene glycols (TEG), alicyclic diols such as cyclohexane dimethanol, polyoxyalkylene glycols such as polyethylene glycol and polypropylene glycol, and the like. They may be used alone or in combination of two or more.

A preferred example of the third aromatic polyester is polytetramethylene terephthalate homopolymer.

The third aromatic polyester has a melting point in the range of 180° to 223° C. When the melting point is below 180° C., heat resistance deteriorates significantly.

The melting point of the third aromatic polyester is preferably in the range of 195° to 223° C.

The third aromatic polyester has an intrinsic viscosity in the range of 0.52 to 1.65 dl/g, preferably 0.54 to 1.55 dl/g, more preferably 0.57 to 1.50 dl/g.

The third aromatic polyester preferably contains 1 to 40 ppm of an alkali metal element. As a method for including the alkali metal element in the third aromatic polyester, the method for including the alkali metal element in the first aromatic copolyester described above can be used. The alkali metal compounds described above can be used as alkali metal element sources.

Although the third aromatic polyester produced by any method can be used, preferred are those obtained using a titanium compound as a polycondensation catalyst.

The molten blend of the second layer (B) contains 60 to 99% by weight of the second aromatic polyester and 1 to 40% by weight of the third aromatic polyester based on the total of the second aromatic polyester and the third aromatic polyester.

When the third aromatic polyester is contained in an amount of less than 1% by weight and the second aromatic polyester in an amount of more than 99% by weight, impact resistance at low temperatures cannot be improved. When the third aromatic polyester is contained in an amount of more than 40% by weight and the second aromatic polyester in an amount of less than 60% by weight, the heat resistance of the film of the second layer (B) decreases and its impact resistance is insufficient.

The molten blend preferably contains 90 to 60% by weight of the second aromatic polyester and 10 to 40% by weight of the third aromatic polyester.

The above molten blend must contain the alkali metal element in an amount of 1 to 40 ppm, preferably 2 to 30 ppm, more preferably 3 to 25 ppm.

When the content of the alkali metal element is below 1 ppm, the effect of suppressing the generation of free terephthalic acid is insufficient, resulting in unsatisfactory flavor retaining property and further insufficient hydrolysis resistance of the laminated film. When the content of the alkali metal element is above 40 ppm, the melt heat stability of the polyester deteriorates, resulting in reduced intrinsic viscosity and marked coloring and further insufficient hydrolysis resistance of the laminated film.

Therefore, the above molten blend can suppress the generation of free terephthalic acid as much as possible and contains not more than 15 ppm of the free terephthalic acid.

To prepare a molten blend containing 1 to 40 ppm of the alkali metal element advantageously, at least either one of the second aromatic polyester and the third aromatic polyester contains 1 to 40 ppm of the alkali metal element.

At least one of the second aromatic polyester and the third aromatic polyester which constitute the second layer (B) preferably contains inert fine particles in an amount of 0.03 to 0.5% by weight based on the molten blend to improve handling property (winding property) in the film-forming process.

The inert fine particles, that is, a lubricant, may be organic or inorganic, while it is preferably inorganic. Examples of the inorganic lubricant include silica, alumina, titanium dioxide, calcium carbonate, barium sulfate and the like, and examples of the organic lubricant include a cross-linked polystyrene particle, silicone resin particle and the like. Any of these lubricants have an average particle diameter preferably in the range of 0.8 to 2.5 μm. When the average particle diameter is above 2.5 μm, a pinhole starting from a coarse particle (having a particle diameter of 10 μm or more, for example) is generated in that portion of the film which is deformed or the film is likely to break in some cases, when a metal plate laminated with the film is deep-drawn to make a can.

In view of the prevention of occurrence of pinholes, the lubricant is preferably a monodisperse lubricant having an average particle diameter of 0.8 to 2.5 μm and a particle diameter ratio (long diameter/short diameter) of 1.0 to 1.2. Specific examples of such a lubricant include spherical silica, spherical titanium dioxide, spherical zirconium, spherical silicone resin particles and the like.

The above-described first aromatic polyester, second aromatic polyester and third aromatic polyester used in the present invention may contain other additives such as an oxidant, thermal stabilizer, viscosity modifier, plasticizer, hue improving agent, adhesion improving agent, nucleating agent, ultraviolet absorber, antistatic agent and the like.

The laminated polyester film of the present invention has a structure of a laminate composed of the first layer (A) and the second layer (B). This laminate-structured film can be produced by a method in which the first aromatic polyester and a molten blend of the second aromatic polyester and the third aromatic polyester forming respective layers are separately molten, co-extruded and laminate-fused before solidified, and then the laminate is biaxially oriented and heat-set, or a method in which each polyester for a respective layer is separately molten and extruded to prepare films, and then the films are laminate-fused before or after stretched. The heat-set temperature can be selected from the range of 150° to 220° C., preferably 160° to 200° C. when the stretched film is heat set.

Preferably, the laminated polyester film of the present invention contains, as a laminated film comprising the first and second layers, 1 to 40 ppm of an alkali metal element.

Particularly preferably, both the first and second layers of the laminated polyester film contain 1 to 40 ppm of the alkali metal element.

Preferably, the laminated polyester film of the present invention contains, as a laminated film, not more than 15 ppm of free terephthalic acid.

Particularly preferably, both the first and second layers of the laminated polyester film contain not more than 15 ppm of free terephthalic acid.

In the laminated polyester film of the present invention, the first layer (A) has a refractive index in the thickness direction preferably in the range of 1.505 to 1.550, more preferably in the range of more than 1.510 and 1.540 or less. When the refractive index is too low, the film is insufficient in moldability, and when the refractive index is too high, the film may have a nearly amorphous structure and may be poor in heat resistance.

The laminated polyester film of the present invention has a thickness preferably in the range of 6 to 75 μm, more preferably 10 to 75 μm, particularly preferably 15 to 50 μm. When the thickness is below 6 μm, the polyester film is liable to break in processing, while when the thickness is above 75 μm, the film has excess in quality which is economically disadvantageous.

The thickness of the second layer (B) (adhesive layer) differs according to the surface roughness of the metal plate. In the case of an ordinary smooth surface, it is sufficient that the film has a thickness of at least 2 μm to achieve stable adhesion. Particularly, when importance is attached to resistance to retort treatment and rustproof property, the film preferably has a thickness of at least 12 μm. Therefore, the ratio (TA/TB) of the thickness of the first layer (A), TA, to the thickness of the second layer (B), TB, is preferably in the range of 0.02 to 0.67, more preferably 0.04 to 0.43, particularly preferably 0.04 to 0.25. Specifically, in the case of a 25 μm thick polyester film, the thickness of the second layer (B) (adhesive layer) is set to 15 to 24.5 μm, preferably 17.5 to 24 μm, more preferably 20 to 24 μm.

As the metal plate to be laminated with the laminated polyester film of the present invention, particularly the metal plate for making cans, tin-plated steel, tin-free steel and aluminum plates are suitable. Lamination of the polyester film onto the metal plate can be conducted by the following method.

The metal plate is heated to a temperature equal to, or higher than a melting point of the film, and laminated on the second layer (B) (adhesive layer) of the laminated polyester film. The resultant laminate is cooled so that the surface portion (thin layer portion) of the film which is in contact with the metal plate is brought into an amorphous state and intimately bonded to the metal plate.

Further, in the laminated polyester film of the present invention, the first layer (A) is generally in direct contact with the second layer (B), but an additional layer may be provided between the first layer (A) and the second layer (B) as required. For instance, another thin adhesive layer, undercoating layer or electrical discharge-treated layer may be provided between the first layer (A) and the second layer (B). An additional layer may be laminated on the other side of the second layer (B) opposite to the side in contact with the first layer (A) as required.

When the second layer (B) of the laminated polyester film is formed of the second aromatic polyester only, adhesion to the metal plate deteriorates greatly and, when the second layer (B) is formed of the third aromatic polyester only, the resulting film becomes soft and viscous when it is laminated with a metal plate, with the result of poor workability. In either case, good laminating property cannot be obtained by using only one of the aromatic polyesters.

Further, when the polyester film is formed of the first layer (A) only, the film is insufficient in adhesion and impact resistance, while when the polyester film is formed of the second layer (B) only, the film is poor in flavor retaining property. Therefore, both cases are inappropriate.

EXAMPLES

The present invention will be further explained hereinafter with reference to the following Examples.

Examples 1 to 6

A polyethylene terephthalate (having an intrinsic viscosity of 0.64 dl/g and containing 20 ppm of potassium element and 0.3% by weight of titanium dioxide having an average particle diameter of 0.3 μm: first aromatic copolyester)

prepared by copolymerizing a component shown in Table 1 and a polyester composition prepared by blending the second aromatic polyester (having an intrinsic viscosity of 0.64 dl/g and containing 20 ppm of potassium element) shown in Table 1 and the third aromatic polyester (having an intrinsic viscosity of 0.90 dl/g and containing 20 ppm of potassium element) shown in Table 1 were individually dried, molten and co-extruded through adjacent dies according to a conventional method to laminate and fuse the extrudates, and the laminate was solidified by quenching to form an unstretched laminated film in which the polyethylene terephthalate formed a first layer (A) and the the polyester composition formed a second layer (B). Then, the above unstretched film was stretched in the longitudinal direction at a stretch ratio of 3.0° at 100° C. and then stretched in the transverse direction at a stretch ratio of 3.2 by elevating temperature from 100° to 150° C., and the stretched film was heat-set at 200° C. to give a biaxially oriented film.

The thus obtained film had a thickness of 25 μm. The first layer (A) had a thickness of 5 μm and the second layer (B) had a thickness of 20 μm.

The addition of potassium element to each of the polyesters was carried out by adding potassium acetate immediately after completion of an ester exchange reaction.

Example 7

The procedure of Example 1 was repeated except that the first aromatic copolyester, the second aromatic polyester and the third aromatic polyester each containing 20 ppm of sodium element in place of potassium element were used to obtain a biaxially oriented film. The addition of the sodium element to each of the polyesters was carried out by adding sodium acetate immediately after completion of an ester exchange reaction.

Example 8

The procedure of Example 1 was repeated except that a polyester containing 2 ppm of potassium element was used as the first aromatic copolyester, the second aromatic polyester and the third aromatic polyester to obtain a biaxially oriented film.

Comparative Example 1

The procedure of Example 1 was repeated except that only the second aromatic polyester was used in the second layer (B) to obtain a biaxially oriented film.

Comparative Example 2

The procedure of Example 1 was repeated except that only the third aromatic polyester was used in the second layer (B) to obtain a biaxially oriented film.

Comparative Example 3

The procedure of Example 1 was repeated except that a single-layered film of 25 μm in thickness was formed of the first aromatic copolyester only of Example 1 to obtain a biaxially oriented film.

Comparative Example 4

The procedure of Example 1 was repeated except that a single-layered film having a thickness of 25 μm and formed of the same composition as the second layer (B) of Example 1 was used to obtain a biaxially oriented film.

Comparative Example 5

The procedure of Example 1 was repeated except that a first polyester shown in Table 1 was used as the first aromatic copolyester, to obtain a biaxially oriented film.

Comparative Example 6

The procedure of Example 1 was repeated except that a second polyester shown in Table 1 was used as the second aromatic copolyester, to obtain a biaxially oriented film.

Comparative Example 7

The procedure of Example 1 was repeated except that a polyester containing 0.5 ppm of potassium element was used as the first aromatic copolyester, the second aromatic polyester and the third aromatic polyester, to obtain a biaxially oriented film.

Comparative Example 8

The procedure of Example 1 was repeated except that a polyester containing 50 ppm of potassium element was used as the first aromatic copolyester, the second aromatic polyester and the third aromatic polyester, to obtain a biaxially oriented film.

Example 9

The procedure of Example 1 was repeated except that addition of potassium acetate to the first aromatic copolyester, the second aromatic polyester and the third aromatic polyester was conducted during melt-extrusion in the production process of a laminated film to obtain a biaxially oriented film.

The measurement results of the contents of the alkali metal element and the free terephthalic acid in the thus obtained laminated biaxially oriented laminated films and their second layers are shown in Table 2. Table 1 shows the polymer composition and properties of the first and second layers constituting each laminated film.

TABLE 1

| | First layer (A) First aromatic copolyester | | | | |
|---|---|---|---|---|---|
| | | Copolymer component | | | |
| | Basic component | Component | mol % | Tm (°C.) | Tg (°C.) |
| Ex.1 | PET | IA | 12 | 229 | 73 |
| Ex.2 | PET | IA | 12 | 229 | 73 |
| Ex.3 | PET | IA | 12 | 229 | 73 |
| Ex.4 | pET | IA | 12 | 229 | 73 |

TABLE 1-continued

| | | | | | |
|---|---|---|---|---|---|
| Ex.5 | PET | IA | 12 | 229 | 73 |
| Ex.6 | PET | AA | 9 | 240 | 60 |
| Ex.7 | PET | IA | 12 | 229 | 73 |
| Ex.8 | PET | IA | 12 | 229 | 73 |
| Ex.9 | PET | IA | 12 | 229 | 73 |
| Comp. Ex.1 | PET | IA | 12 | 229 | 73 |
| Comp. Ex.2 | PET | IA | 12 | 229 | 73 |
| Comp. Ex.3 | PET | IA | 12 | 229 | 73 |
| Comp. Ex.4 | — | — | — | — | — |
| Comp. Ex.5 | PET | IA | 3 | 251 | 75 |
| Comp. Ex.6 | PET | IA | 12 | 229 | 73 |
| Comp. Ex.7 | PET | IA | 12 | 229 | 73 |
| Comp. Ex.8 | PET | IA | 12 | 229 | 73 |

| | Second layer (B) | | | | | | | | | |
|---|---|---|---|---|---|---|---|---|---|---|
| | Second Aromatic polyester | | | | | | Third Aromatic polyester | | | |
| | Basic | Copolymer component | | | | Propor- | Basic | Copolymer component | | Propor- |
| | compo-nent | Compo-nent | mol % | Tm (°C.) | Tg (°C.) | tion (%) | compo-nent | Compo-nent | mol % | Tm (°C.) | tion (%) |
| Ex.1 | PET | IA | 12 | 229 | 73 | 70 | PBT | — | — | 223 | 30 |
| Ex.2 | PET | IA | 12 | 229 | 73 | 70 | PBT | IA | 5 | 214 | 30 |
| Ex.3 | PET | IA | 6 | 244 | 74 | 70 | PBT | — | — | 223 | 30 |
| Ex.4 | PET | SA | 9 | 240 | 60 | 70 | PBT | — | — | 223 | 30 |
| Ex.5 | PET | IA | 12 | 229 | 73 | 70 | PET | SA | 25 | 197 | 30 |
| Ex.6 | PET | IA | 12 | 229 | 73 | 70 | PET | — | — | 223 | 30 |
| Ex.7 | PET | IA | 12 | 229 | 73 | 70 | PBT | — | — | 223 | 30 |
| Ex.8 | PET | IA | 12 | 229 | 73 | 70 | PET | — | — | 223 | 30 |
| Ex.9 | PET | IA | 12 | 229 | 73 | 70 | PBT | — | — | 223 | 30 |
| Comp. Ex.1 | PET | IA | 20 | 210 | 71 | 100 | — | — | — | — | — |
| Comp. Ex.2 | — | — | — | — | — | — | PBT | — | — | 223 | 100 |
| Comp. Ex.3 | — | — | — | — | — | — | — | — | — | — | — |
| Comp. Ex.4 | PET | IA | 12 | 229 | 73 | 70 | PBT | — | — | 223 | 30 |
| Comp. Ex.5 | PET | IA | 12 | 229 | 73 | 70 | PBT | — | — | 223 | 30 |
| Comp. Ex.6 | PBT | IA | 15 | 198 | 32 | 70 | PBT | — | — | 223 | 30 |
| Comp. Ex.7 | PET | IA | 12 | 229 | 73 | 70 | PBT | — | — | 223 | 30 |
| Comp. Ex.8 | PET | IA | 12 | 229 | 73 | 70 | PBT | — | — | 223 | 30 |

Ex.: Example,
Comp. Ex.: Comparative Example

TABLE 2

| | Content in the second layer | | Content in the laminated biaxially oriented film | |
|---|---|---|---|---|
| | Alkali metal element (ppm) | Free terephtahalic acid (ppm) | Alkali metal element (ppm) | Free terephthalic acid (ppm) |
| Ex.1 | Potassium 20 | 7 | Potassium 20 | 7 |
| Ex.2 | Potassium 20 | 7 | Potassium 20 | 7 |
| Ex.3 | Potassium 20 | 7 | Potassium 20 | 7 |
| Ex.4 | Potassium 20 | 7 | Potassium 20 | 7 |
| Ex.5 | Potassium 20 | 7 | Potassium 20 | 7 |
| Ex.6 | Potassium 20 | 7 | Potassium 20 | 7 |
| Ex.7 | Sodium 20 | 7 | Sodium 20 | 7 |
| Ex.8 | Potassium 2 | 14 | Potassium 2 | 14 |
| Ex.9 | Potassium 20 | 7 | Potassium 20 | 7 |
| Comp. Ex.1 | Potassium 20 | 7 | Potassium 20 | 7 |
| Comp. Ex.2 | Potassium 20 | 9 | Potassium 20 | 9 |
| Comp. Ex.3 | Potassium 20 | 7 | Potassium 20 | 7 |
| Comp. Ex.4 | — | — | Potassium 20 | 7 |
| Comp. Ex.5 | Potassium 20 | 7 | Potassium 20 | 7 |
| Comp. Ex.6 | Potassium 20 | 7 | Potassium 20 | 7 |

TABLE 2-continued

|  | Content in the second layer | | Content in the laminated biaxially oriented film | |
|---|---|---|---|---|
|  | Alkali metal element (ppm) | Free terephtahalic acid (ppm) | Alkali metal element (ppm) | Free terephthalic acid (ppm) |
| Comp. Ex.7 | Potassium 0.5 | 32 | Potassium 0.5 | 30 |
| Comp. Ex.8 | Potassium 50 | 5 | Potassium 50 | 5 |

Ex.: Example
Comp. Ex.: Comparative Example

In Table 1, IA stands for isophthalic acid, AA adipic acid, SA sebacic acid, PET polyethylene terephthalate, and PBT polybutylene terephthalate. Further, Tg stands for glass transition temperature and Tm melting point.

The content of the alkali metal element in the film was determined by the atomic absorption analysis of a liquid obtained by heating and dissolving about 1 g of a film sample in 10 ml of ortho-chlorophenol and extracting with 20 ml of hydrochloric acid.

The content of the free terephthalic acid in the film was determined by the liquid chromatography of a filtrate prepared by dissolving about 500 mg of a film sample in 3 ml of hexafluoroisopropanol, adding 10 ml of methanol to the resulting solution to reprecipitate a polymer content and filtrating the polymer.

As a column for the liquid chromatography, SHODEX RSPAK D8-613 (having an inner diameter of 6 mm and a length of 150 mm) was used, and detection was conducted with UV ray (254 nm).

The contents of the alkali metal element and the free terephthalic acid in the second layer were obtained by cutting out the laminated film on the side of the second layer to obtain a molten blend polymer constituting the second layer and then, analyzing the cut-out sample in the same manner as in the film sample.

Each of the seventeen films obtained in Examples 1 to 9 and Comparative Examples 1 to 8 was laminated with a tin-free steel plate heated at a temperature higher than the melting point of the polyester and the laminates were cooled to obtain coated steel plates. These coated steel plates were evaluated for their laminating property on the basis of the following standards.

(1) Laminating property
(A) standards for air bubbles and wrinkles
○: No bubbles and wrinkles could be seen.
δ: A few bubbles and wrinkles could be seen in a length of 10 m.
X: Many bubbles and wrinkles could be seen.
(B) standards for heat shrinkage
○: Heat shrinkage percentage was less than 2%.
δ: Heat shrinkage percentage was 2% or more and less than 5%.
X: Heat shrinkage percentage was 5% or more.

The tin-free steel plates laminated with the above-described polyester films were cut into disk-shaped pieces having a diameter of 150 mm, and the pieces were deep-drawn at four stages with a drawing die and a punch to produce side-seamless containers having a diameter of 55 mm (to be abbreviated as "cans" hereinafter).

The above cans were observed and tested, and evaluated on the basis of the following standards.

(2) Deep-draw processability-1
○: A laminate could be processed without causing any defect on a film, and the film showed no opacification or breakage.

δ: Whitening of the film was observed at upper portion of the metal can.
X: Breakage was observed in some portions of the film.

(3) Deep-draw processability-2
○: A laminate was deep-drawn without causing any defect on a film, and when the inner film-coated surface was subjected to a rustproof test (hereinafter referred to as ERV test) (1% NaCl aqueous solution was charged in the can, an electrode was inserted therein, the can body was used as an anode, and when a voltage of 6 V was applied, an electric current value was measured), the current value was 0.1 mA or less.
X: A film visually showed no defects, while the measured current value was more than 0.1 mA in ERV test. When the part through which the electric current was passed was magnified for observation, pinhole-like cracks starting at coarse lubricant particles were observed in the sample film.

(4) Adhesion
Excellently deep-drawn cans were filled with water to full and subjected to a retort treatment for 90 minutes at 120° C. in a steam sterilizer. Thereafter, the cans were stored at 50° C. for 3 months. A cross was cut on the thus obtained cans to observe the adhesion of the film.
○: The film was firmly adhered to the steel plate and did not peel off even when a cross-cut was given.
δ: Adhesion slightly deteriorated by a cross-cutting.
X: The film peeled off by a cross-cutting.

(5) Rust-proof property
Excellently deep-drawn cans were filled with an aqueous 5% NaCl solution to full and stored at 50° C. for 7 days. Rust generation was visually observed for ten of the cans as one group. The results were evaluated as follows.
○: Generation of rust was not observed in all of the ten cans.
δ: Generation of rust was observed in 1 to 5 of the cans.
X: Generation of rust was observed in 6 or more of the cans.

(6) Impact resistance
Excellently deep-drawn cans were filled with water to full, and cooled to 10° C. Ten water-filled cans of the same laminate as one group were dropped from a height of 30 cm on a polyvinyl chloride tiled floor. Then, the cans were subjected to an ERV test. The results were evaluated as follows.
○: All of the ten cans showed a current value of 0.1 mA or less.
δ: 1 to 5 of the cans showed a current value of more than 0.1 mA.
X: 6 or more of the cans showed a current of more than 0.1 mA, or cracks in the film were observed immediately after dropping.

(7) Resistance to embrittlement under heat
Excellently deep-drawn cans were heated at 200° C. for 5 minutes and thereafter evaluated for impact resistance in the same manner as described in (6) above.

15

○: All of the ten cans showed a current value of 0.1 mA or less.

δ: 1 to 5 of the cans showed a current value of more than 0.1 mA.

X: 6 or more of the cans showed a current value of more than 0.1 mA, or cracks in the film are observed after heating at 200° C. for 5 minutes.

(8) Resistance to retort treatment

Excellently deep-drawn cans were filled with water to full, subjected to a retort treatment at 120° C. for an hour in a steam sterilizer, and thereafter stored at 50° C. for 30 days. Then, ten water-filled cans of the same laminate as one group were dropped from a height of 50 cm on a polyvinyl chloride tiled floor. Then, the cans were subjected to an ERV test.

○: All of the ten cans showed a current value of 0.1 mA or less.

δ: 1 to 5 of the cans showed a current value of more than 0.1 mA.

X: 6 or more of the cans showed a current of more than 0.1 mA, or cracks in the film are observed immediately after dropping.

(9) Flavor retaining property

Excellently deep-drawn cans were filled with 10 bottles of ion exchange water (obtained by reducing the amount of ions contained in the supernatant of the ion exchange water with a cation exchange resin and an anion exchange resin and then distilling the ion exchange water) and tightly closed. The cans were stored at room temperature for 1 month and then opened, and the content was sensory-tested for changes in taste and flavor.

○: No changes in taste and flavor

δ: Small changes in taste and flavor were found in 2 to 3 of the cans.

X: Changes in taste and flavor were found in 5 or more of the cans.

16

(10) Resistance to hydrolysis at high-temperatures, of films

A film sample obtained by cutting each of the polyester films into a 21×30 cm piece was immersed in 300 ml of ion exchange water and kept at 100° C. for 7 days. The viscosity of the film sample was measured and a reduction in the viscosity of the film before and after the test was obtained to evaluate the high-temperature hydrolysis resistance of the film on the basis of the following standards.

○: A reduction in the viscosity of the film was less than 30%.

δ: A reduction in the viscosity of the film was 30% or more and less than 50%.

X: A reduction in the viscosity of the film was 50% or more.

The results of the above evaluations of 10 kinds are shown in Table 3. In Table 3, the mark "-" indicates that evaluation was not made.

TABLE 3

| | Laminating property | | Deep draw processability | Deep draw processability | Adhesion | Rustproof property | Impact resistance | Resistance to embrittlement under heat | Resistance to retort treatment | Flavor retaining property | Resistance to hydrolysis high temperature |
|---|---|---|---|---|---|---|---|---|---|---|---|
| | (A) | (B) | -1 | -2 | | | | | | | |
| Ex.1 | ○ | ○ | ○ | ○ | ○ | ○ | ○ | ○ | ○ | ○ | ○ |
| Ex.2 | ○ | ○ | ○ | ○ | ○ | ○ | ○ | ○ | ○ | ○ | ○ |
| Ex.3 | ○ | ○ | ○ | ○ | ○ | ○ | ○ | ○ | ○ | ○ | ○ |
| Ex.4 | ○ | ○ | ○ | ○ | ○ | ○ | ○ | ○ | ○ | ○ | ○ |
| Ex.5 | ○ | ○ | ○ | ○ | ○ | ○ | ○ | ○ | ○ | ○ | ○ |
| Ex.6 | ○ | ○ | ○ | ○ | ○ | ○ | ○ | ○ | ○ | ○ | ○ |
| Ex.7 | ○ | ○ | ○ | ○ | ○ | ○ | ○ | ○ | ○ | ○ | ○ |
| Ex.8 | ○ | ○ | ○ | ○ | ○ | ○ | ○ | ○ | ○ | ○ | ○ |
| Ex.9 | ○ | ○ | ○ | ○ | ○ | ○ | ○ | ○ | ○ | ○ | ○ |
| Comp. Ex.1 | ○ | ○ | ○ | X | ○ | ○ | X | X | Δ | ○ | ○ |
| Comp. Ex.2 | X | X | — | — | — | — | — | — | — | — | ○ |
| Comp. Ex.3 | ○ | ○ | ○ | Δ | Δ | Δ | X | Δ | Δ | ○ | ○ |
| Comp. Ex.4 | ○ | ○ | ○ | Δ | ○ | ○ | ○ | ○ | ○ | Δ | Δ |
| Comp. Ex.5 | ○ | ○ | Δ | X | ○ | Δ | Δ | ○ | ○ | ○ | ○ |
| Comp. Ex.6 | ○ | ○ | ○ | ○ | ○ | ○ | ○ | X | Δ | ○ | ○ |
| Comp. Ex.7 | ○ | ○ | ○ | ○ | ○ | ○ | ○ | Δ | X | X | X |
| Comp. Ex.8 | ○ | Δ | ○ | Δ | Δ | Δ | Δ | X | X | Δ | X |

Ex.: Example
Comp. Ex.: Comparative Example

Table 3 clearly shows that the cans using the polyester film of the present invention are excellent in laminating property, deep-draw processability, resistance to embrittlement under heat, retort resistance, rustproof property, impact resistance and adhesion, and in particular, in flavor retaining property.

The polyester film for molding to be laminated on a metal plate of the present invention is excellent in moldability, heat resistance, impact resistance, retort resistance, rustproof property and adhesion, and remarkably excellent in flavor retaining property. Therefore, the film is suitable for use in deep-drawn metal cans, particularly beverage cans and food cans.

What is claimed is:

1. A laminated polyester film to be laminated on a metal plate, which comprises:

(A) a first layer formed of a first aromatic copolyester which contains terephthalic acid as a main dicarboxylic acid component and ethylene glycol as a main glycol component and which has a melting point in the range of 210° to 245° C. and a glass transition temperature of at least 60° C., and (B) a second layer formed of a molten blend which comprises 60 to 99% by weight of a second aromatic polyester which second aromatic polyester contains ethylene terephthalate as a main recurring unit and which has a melting point in the range of 210° to 255° C. and a glass transition temperature of at least 60° C., and 1 to 40% by weight of a third aromatic polyester which third aromatic polyester contains tetramethylene terephthalate as a main recurring unit and which has a melting point of 180° to 223° C., and wherein said second layer contains 1 to 40 ppm of alkali metal based on the weight of the second layer, and providing that said laminated film contains 1 to 40 ppm of alkali metal based on the weight of the entire laminated film, and wherein the second layer contains free terephthalic acid in an amount of not more than 15 ppm, based on the weight of the second layer, and providing that the said laminated film contains free terephthalic acid in an amount of not more than 15 ppm, based on the weight of the entire laminated film, and (C) which laminated film when said second layer (B) is laminated to a metal plate and deep-drawn and subsequently subjected to a rust proofing ERV test shows an electrical current value of 0.1 mA or less.

2. The laminated polyester film of claim 1, wherein the first aromatic copolyester contains 2 to 19 mol % of ethylene isophthalate, based on the total amount of the first aromatic copolyester.

3. The laminated polyester film of claim 1, wherein the first aromatic copolyester has a melting point in the range of 215° to 235° C.

4. The laminated polyester film of claim 1, wherein the first aromatic copolyester has a glass transition temperature of at least 70° C.

5. The laminated polyester film of claim 1, wherein the first aromatic copolyester has an intrinsic viscosity of 0.52 to 1.5 dl/g.

6. The laminated polyester film of claim 1, wherein the first aromatic copolyester contains 1 to 40 ppm of alkali metal, based on the weight of the first aromatic copolyester.

7. The laminated polyester film of claim 1, wherein the first aromatic copolyester is produced in the presence of a germanium compound as a polycondensation catalyst.

8. The laminated polyester film of claim 1, wherein the first aromatic copolyester contains 0.01 to 1% by weight of inert fine particles having an average particle diameter of 0.05 to 0.6 μm.

9. The laminated polyester film of claim 8, wherein the inert fine particles are spherical.

10. The laminated polyester film of claim 1, wherein the second aromatic polyester contains at least one dicarboxylic acid component selected from the group consisting of an aliphatic dicarboxylic acid, an alicyclic dicarboxylic acid and an aromatic dicarboxylic acid other than terephthalic acid in an amount of 2 to 19 mol % based on the amount of the terephthalic acid and said at least one dicarboxylic acid component.

11. The laminated polyester film of claim 1, wherein the second aromatic polyester contains at least one glycol selected from the group consisting of an alicyclic glycol and an aliphatic glycol other than ethylene glycol in an amount of 2 to 19 mol % based on the amount of the ethylene glycol and said at least one glycol component of the second aromatic polyester.

12. The laminated polyester film of claim 1, wherein the second aromatic polyester has a melting point in the range of 220° to 245° C.

13. The laminated polyester film of claim 1, wherein the second aromatic polyester has an intrinsic viscosity in the range of 0.52 to 1.50 dl/g.

14. The laminated polyester film of claim 1, wherein the second aromatic polyester is produced in the presence of a germanium compound as a polycondensation catalyst.

15. The laminated polyester film of claim 1, wherein the second aromatic polyester contains 1 to 40 ppm of alkali metal, based on the weight of the second aromatic polyester.

16. The laminated polyester film of claim 1, wherein the third aromatic polyester has a melting point of 195° C. to 223° C.

17. The laminated polyester film of claim 1, wherein the third aromatic polyester has an intrinsic viscosity in the range of 0.52 to 1.65 dl/g.

18. The laminated polyester film of claim 1, wherein the third aromatic polyester contains 1 to 40 ppm of alkali metal, based on the weight of the third aromatic polyester.

19. The laminated polyester film of claim 1, wherein the molten blend comprises 90 to 60% by weight of the second aromatic polyester and 10 to 40% by weight of the third aromatic polyester.

20. The laminated polyester film of claim 1, wherein the molten blend contains 0.03 to 0.5% by weight of inert fine particles having an average particle diameter of 0.8 to 2.5 μm.

21. The laminated polyester film of claim 1, wherein a ratio of a thickness of the first layer (A) to a thickness of the second layer (B) is in the range of 0.02 to 0.67.

22. The laminated polyester film of claim 1 which has a thickness of 6 to 75 μm.

23. The laminated polyester film of claim 1 wherein the second layer (B) of the polyester film is laminated on a metal plate for making a metal can by deep-draw processing.

24. A laminated polyester film to be laminated on a metal plate, which comprises:

(A) a first layer formed of a first aromatic copolyester which contains terephthalic acid as a main dicarboxylic acid component and ethylene glycol as a main glycol component and which has a melting point in the range of 210° to 245° C., a glass transition temperature of at least 60° C. and an intrinsic viscosity of 0.52 to 1.5 dl/g, and (B) a second layer formed of a molten blend which comprises 90 to 60% by weight of a second aromatic polyester which second aromatic polyester contains ethylene terephthalate as a main recurring unit and which has a melting point in the range of 210° to 255° C., a glass transition temperature of at least 60° C. and an intrinsic viscosity of 0.52 to 1.5 dl/g, and 10 to 40% by weight of a third aromatic polyester which third aromatic polyester contains tetramethylene terephthalate as a main recurring unit and which has a melting point of 180° to 223° C. and an intrinsic viscosity of 0.52 to 1.65 dl/g, and at least one of the first, second or third aromatic polyester contains 1 to 40 ppm of alkali metal, and provided that said laminated film contains 1 to 40 ppm of alkali metal, based on the weight of the entire laminated film, and wherein the laminated polyester film contains free terephthalic acid in an amount of not more than 15 ppm based on the weight of the entire laminated polyester film and (C) which laminated film when said second layer (B) is laminated to a metal plate and deep-drawn and subsequently subjected to a rust proofing ERV test shows an electrical current value of 0.1 mA or less.

25. A laminated polyester film to be laminated on a metal plate, which comprises:

(A) a first layer formed of a first aromatic copolyester which contains terephthalic acid as a main dicarboxylic acid component and ethylene glycol as a main glycol component and at least one dicarboxylic acid which is a member selected from the group consisting of isophthalic acid, adipic acid and sebacic acid, and which has a melting point in the range of 215° to 235° C., a glass transition temperature of at least 70° C. and an intrinsic viscosity of 0.52 to 1.5 dl/g, and (B) a second layer formed of a molten blend which comprises 90 to 60% by weight of a second aromatic polyester which second aromatic polyester contains ethylene terephthalate as a main recurring unit and at least one dicarboxylic acid which is a member selected from the group consisting of isophthalic acid, adipic acid and sebacic acid, and which has a melting point in the range of 220° to 245° C., a glass transition temperature of at least 60° C. and an intrinsic viscosity of 0.52 to 1.5 dl/g, and which comprises 10 to 40% by weight of a third aromatic polyester which third aromatic polyester contains tetramethylene terephthalate as a main recurring unit and which has a melting point of 195° to 223° C. and an intrinsic viscosity of 0.52 to 1.65 dl/g, and at least one of the second or third aromatic polyester contains 1 to 40 ppm of an alkali metal, and providing that said laminated film contains 1 to 40 ppm alkali metal, based on the weight of the entire laminated film, and wherein the laminated polyester film contains free terephthalic acid in an amount of not more than 15 ppm based on the weight of the entire laminated polyester film, (C) which laminated film when said second layer (B) is laminated to a metal plate and deep-drawn and subsequently subjected to a rust proofing ERV test shows an electrical current value of 0.1 mA or less.

* * * * *